United States Patent
Saib et al.

(10) Patent No.: US 6,292,624 B1
(45) Date of Patent: *Sep. 18, 2001

(54) SYSTEM AND METHOD FOR SELECTION/DESELECTION OF TIMER RECORDING

(75) Inventors: Joseph Saib; Atsushi Suzuki, both of San Diego, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/854,910

(22) Filed: May 13, 1997

(51) Int. Cl.$^7$ .................................................. H04N 5/91
(52) U.S. Cl. .............................. 386/83; 348/13; 348/906; 345/327
(58) Field of Search .................... 386/46, 83; 348/13, 348/906, 7, 10, 12, 569; 345/327–328; 455/179.1, 5.1, 181.1, 4.2, 185.1, 186.1; H04N 5/91

(56) References Cited

U.S. PATENT DOCUMENTS

| | | | | |
|---|---|---|---|---|
| 5,237,417 | * | 8/1993 | Hayashi et al. | 358/183 |
| 5,367,316 | * | 11/1994 | Ikezaki | 345/158 |
| 5,434,626 | * | 7/1995 | Hayashi et al. | 348/569 |
| 5,436,676 | * | 7/1995 | Pint et al. | 348/734 |
| 5,479,266 | * | 12/1995 | Young et al. | 358/335 |
| 5,488,409 | * | 1/1996 | Yuen et al. | 348/5 |
| 5,517,254 | * | 5/1996 | Monta et al. | 348/569 |
| 5,523,796 | * | 6/1996 | Marshall et al. | 348/589 |
| 5,539,479 | * | 7/1996 | Bertram | 348/564 |
| 5,541,738 | * | 7/1996 | Mankovitz | 358/335 |
| 5,557,422 | * | 9/1996 | Nishigaki et al. | 358/335 |
| 5,585,866 | * | 12/1996 | Miller et al. | 348/731 |
| 5,594,509 | * | 1/1997 | Florin et al. | 348/731 |
| 5,629,733 | * | 5/1997 | Youman et al. | 348/13 |
| 5,640,484 | * | 6/1997 | Mankovitz | 386/83 |
| 5,646,603 | * | 7/1997 | Nagata et al. | 340/825.25 |
| 5,657,414 | * | 8/1997 | Lett et al. | 386/35 |
| 5,822,123 | * | 6/2000 | Davis et al. | 348/906 |
| 5,867,226 | * | 2/1999 | Wehmeyer et al. | 348/906 |
| 5,880,768 | * | 3/1999 | Lemmons et al. | 348/906 |
| 6,075,575 | * | 6/2000 | Schein et al. | 348/906 |

* cited by examiner

Primary Examiner—Wendy Garber
Assistant Examiner—Vincent F. Boccio
(74) Attorney, Agent, or Firm—Blakely, Sokoloff, Taylor & Zafman LLP (57) ABSTRACT

The present invention relates to a home entertainment system and method for selectively recording or purchasing a show broadcast for receipt by the home entertainment system to perform selective recording or purchasing an electronic guide screen is initially produced. Upon viewing the electronic guide screen, a viewer may select a show to be entered into timer memory. This selection prompts the viewer to select whether or not to record the show. Thereafter, the programming data associated with the show is loaded into timer memory along with information indicating whether the show is scheduled to be recorded.

20 Claims, 7 Drawing Sheets

ABSTRACT

SYSTEM AND METHOD FOR SELECTION/DESELECTION OF TIMER RECORDING

BACKGROUND OF THE INVENTION

1. Field of the Invention

The present invention relates to a system and method for selectively recording a show without using a timer set-up screen.

2. Description of Art Related to the Invention

Over the last few years, there has been a growing demand for entertainment systems working in conjunction with various types of broadcasting systems. One type of entertainment system includes a broadcast satellite system; namely, a digital satellite system (DSS). Normally, a DSS comprises an antenna, an integrated receiver decoder (IRD) and a television receiver (TV). Also, the DSS may include an analog video cassette recorder (VCR) to receive analog data for recording purposes. The operations of the IRD are controlled by a remote control.

The antenna receives and routes digital bit streams to the IRD. Typically, a digital bit stream includes sensory data (e.g., video and/or audio) and programming data for one or more shows. The programming data is periodically updated and stored within the IRD and the prior programming data is erased (e.g., deleted, overwritten, etc.). If a show is scheduled to be recorded, its programming data is stored within timer memory of the IRD. Usually, timer memory is non-volatile memory containing programming data for all shows scheduled to be recorded (generally referred to as "record data"). The IRD periodically accesses the record data to determine whether it should tune to a channel and process portions of an incoming digital bit stream into analog signals recognized by the analog VCR.

Figure 1:
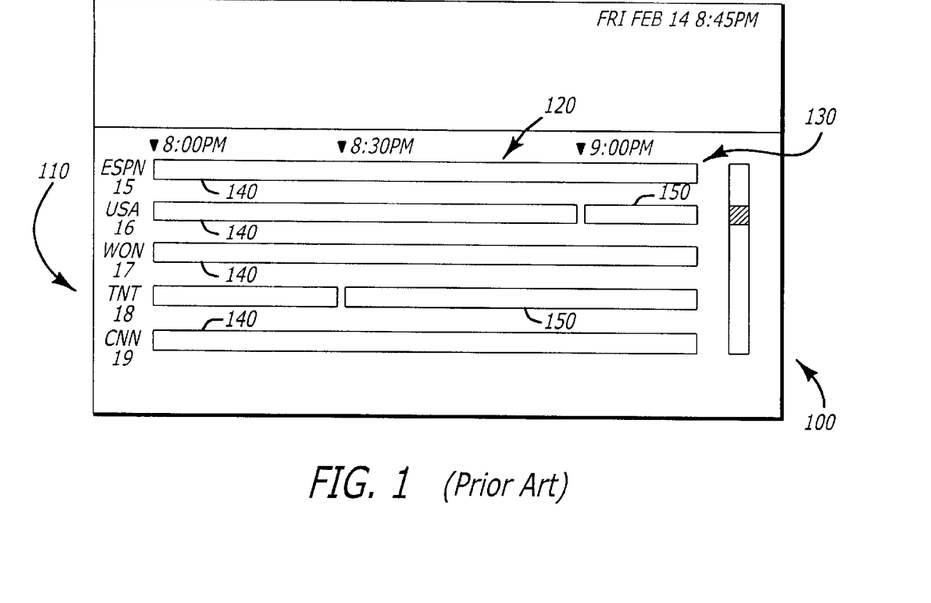
FIG. 1 is a conventional electronic guide screen displayed on a television receiver illustrating shows that currently being broadcast and scheduled to be broadcast in the future.

Upon receiving a first command from the remote control, the IRD generates an "electronic guide screen" displaying programming data for each show capable of being received by the DSS. As shown in FIG. 1, the electronic guide screen 100 is displayed in a format similar to a well-known format used by television guide publications. The electronic guide screen 100 features (i) a vertical border 110 displaying a plurality of broadcast channel numbers sorted in numerical order, and (ii) a horizontal border 120 that displays time intervals usually in one-half hour increments. Each show broadcast over a recognized broadcast channel is assigned to a horizontal show grid 130. The length and horizontal positioning of each grid 130 is based on its start-time and end-time. Thus, the duration of the particular show is ascertained by locating its assigned grid and calculating its duration using the time intervals in the horizontal border 120.

Figure 2:
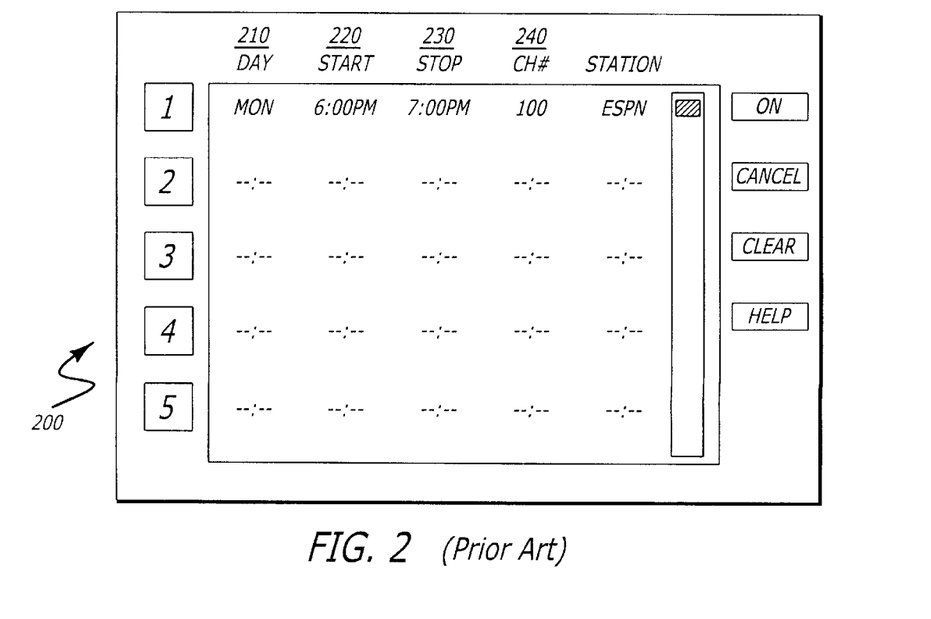
FIG. 2 is a conventional timer set-up screen displayed on a television receiver.

In order to erase programming data from the IRD, the user normally needs to exit the electronic guide screen and depress one or more buttons on the remote control until a timer set-up screen is displayed on the TV. As shown in FIG. 2, the timer set-up screen 200 displays programming data, stored within the IRD, that is required for an analog VCR to perform a timer event (e.g., record a show, decode and display a pay-per-view show, etc.). The programming data includes a recording interval (one-time record, daily, or weekly) 210 corresponding to the day in which the show is broadcast, start-time of the show 220, end-time of the show 230, and its broadcast channel number 240.

It is recognized that shows featured by the record data will be recorded as long as a video cassette tape is properly inserted into a powered analog VCR. This has caused recording errors to frequently occur. Examples of these recording errors include accidental recording over portions of another recorded show, or failure to completely record a desired show due to accidental recording of an earlier show.

The reason for frequent recording errors is that substantial user interaction is needed to prevent a show, having its programming data already loaded into the timer memory, from being recorded. Normally, one of the following events would need to occur to prevent a show from being recorded: (i) deactivation the analog VCR, (ii) erasure of programming data of a show not scheduled to be recorded from timer memory, or (iii) removal of the video cassette tape from the analog VCR. By developing a system and method that allows selection or deselection of a show to be recorded without substantial user interaction, the frequency of recording errors may be reduced. To further mitigate user interaction, selection or deselection of the show may be performed when viewing the electronic guide screen.

SUMMARY OF THE INVENTION

The present invention relates to an entertainment system and method for selectively recording or purchasing a show broadcast receipt by the entertainment system. This may be accomplished by producing an electronic guide screen, and upon viewing the electronic guide screen, a viewer may select a show to be entered into timer memory. This selection further prompts the viewer to select whether or not to record the show. Thereafter, the programming data associated with the show is loaded into timer memory along with information indicating whether the show is scheduled to be recorded.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to a system and method for selectively recording a show without requiring erasure from timer memory programming data associated with those shows not scheduled to be recorded. The present invention further relates to a method for loading or erasing programming data when viewing the electronic guide screen.

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. Stored within the system, "timer data" includes programming data of shows scheduled to be recorded and programming data of shows chosen by the user to be entered into timer memory but are not scheduled to be recorded. Timer data may further include programming data of shows that have been purchased for viewing. While certain illustrative embodiments are described in order to convey the spirit and scope of the present invention, such embodiments should not be construed as a limitation on the scope of the present invention.

Figure 3:
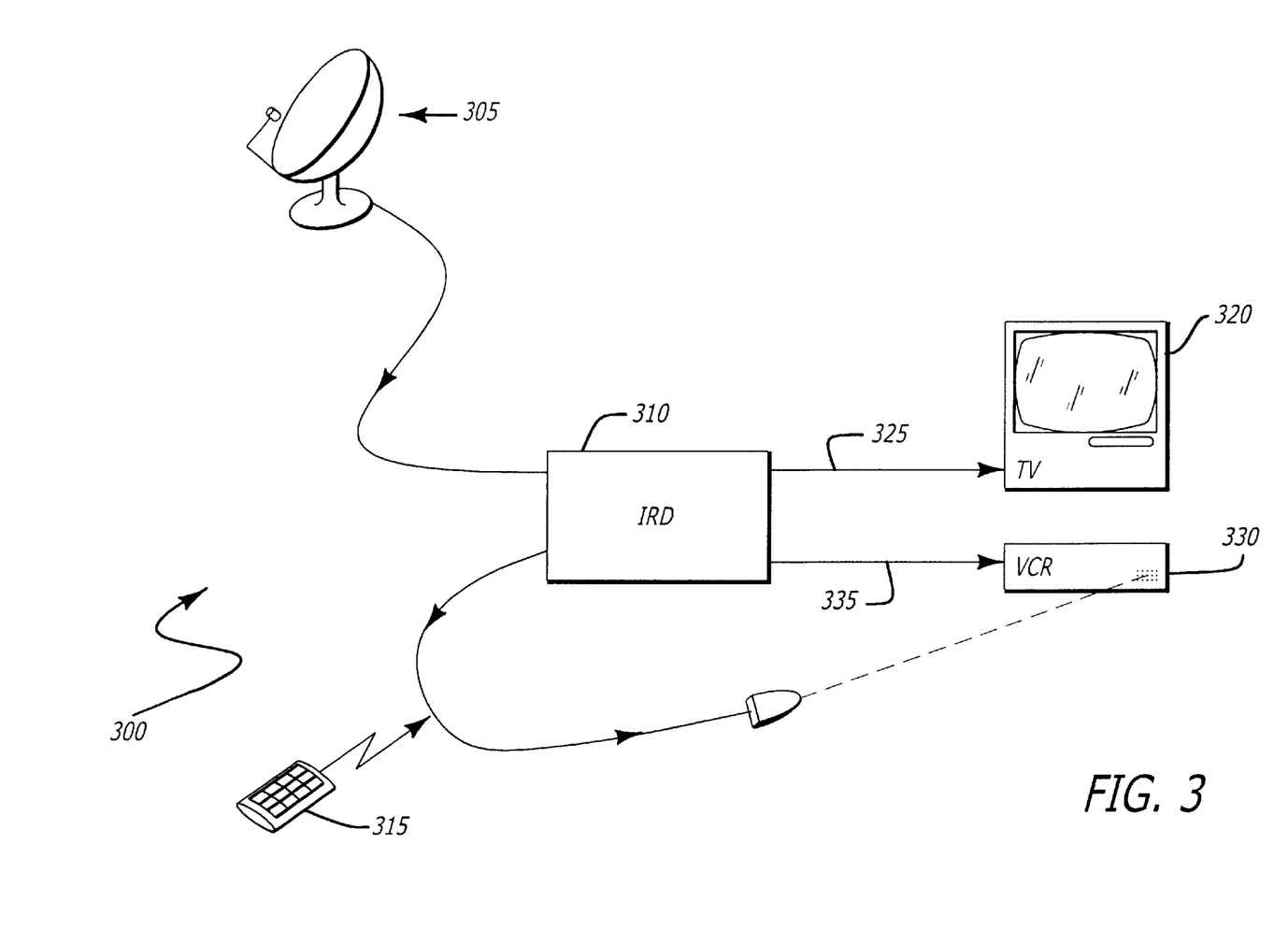
FIG. 3 is an illustrative embodiment of an entertainment system utilizing the present invention.

Referring to FIG. 3, one embodiment of an entertainment system utilizing the present invention is shown. The entertainment system 300 comprises an antenna 305, a broadcast receiver 310 such as an integrated receiver decoder (IRD) for example, and at least one analog-input peripheral device (e.g., a display monitor such as television receiver "TV" 320 and/or an analog recording device 330 such as a video cassette recorder "VCR"). The broadcast receiver, in general, receives a broadcast signal (a digital bit stream for example) and performs operations on the broadcast signal to produce digital and/or analog information. Although the IRD is implemented as the broadcast receiver in this embodiment, other types of broadcast receivers may be used such as a cable box for a Cable Broadcasting System, an Internet terminal, a digital satellite system (DSS) computer and the like.

Antenna 305 receives the digital bit stream from an orbiting satellite (not shown) and routes the bit stream to IRD 310. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows. The control information for each show includes programming data having the following content: date of broadcast, broadcast channel number, show start-time, show end-time, and also show title.

IRD 310 is responsible for decoding the bit stream, for storing programming data in timer memory accessible by timer software executed by IRD 310, and for processing the decoded bit stream to produce one or more output signals having appropriate formats. As shown, an output signal is placed in an analog format and sent via communication line 325 to TV 320 for viewing, and/or via communication line 335 to analog recording device 330 for recording. The analog format may be in accordance with a video format established by National Television Systems Committee (NTSC), or perhaps other video formats, including but is not limited or restricted to Phase Alternating Line (PAL), Sequential Couleur avec Memoire (SECAM) and other recognized formats.

The timer software is coded to support a data structure having a plurality of parameters. Upon executing timer software to perform a timer event for a show (e.g., recording, tune to a channel of a purchased show, etc.), each parameter is loaded with a portion of programming data associated with that show. For example, a first parameter of the data structure is loaded with the show title while other parameters are loaded with the date of broadcast, the broadcast channel number, the show start-time, and the show end-time. In addition, the data structure further includes a record parameter, loaded with a state value assigned to a selected option grid (see FIG. 6), to indicate to the timer software whether the show is to be recorded.

Figure 6:
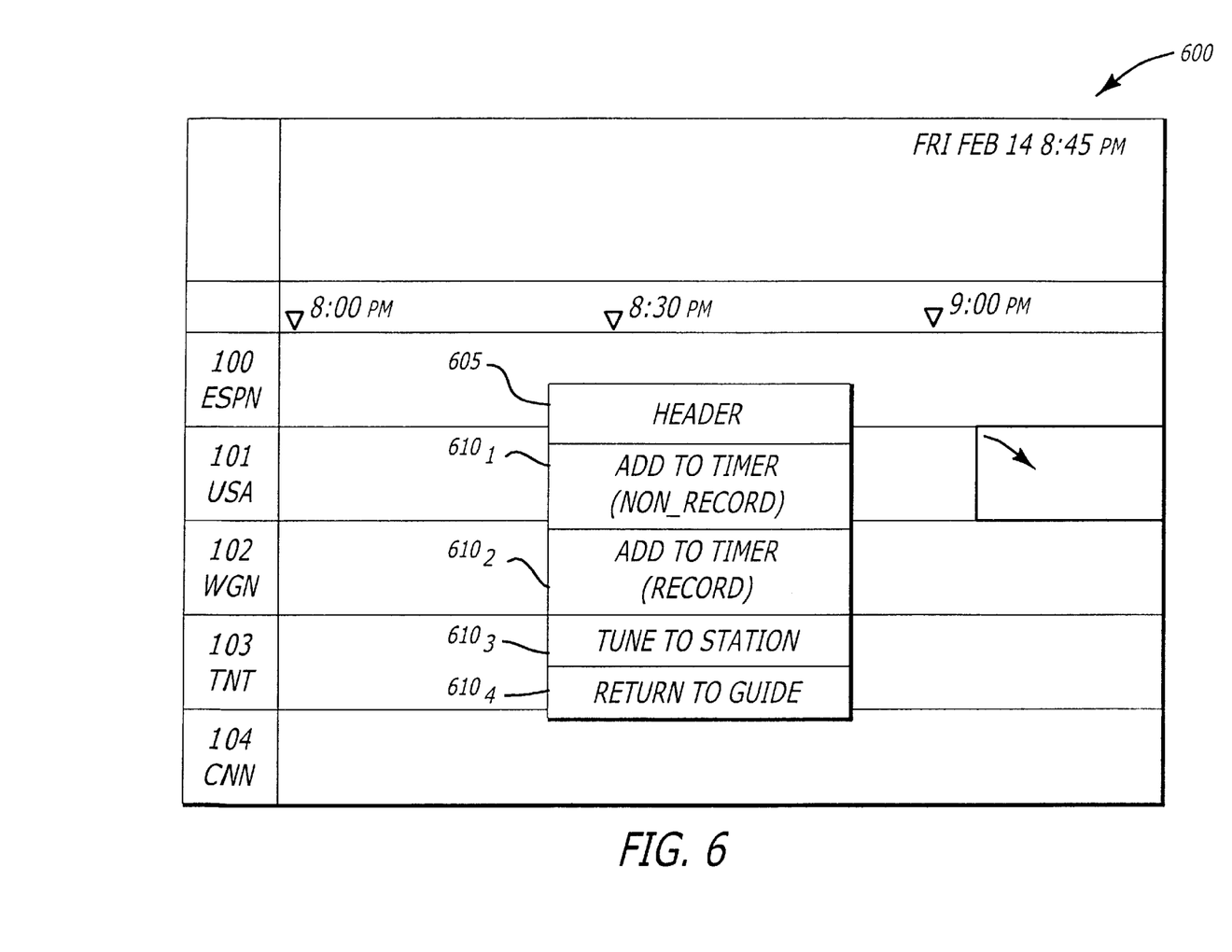
FIG. 6 is an embodiment of a screen menu, including a header and a plurality of option grids, superimposed over the electronic guide screen when selecting recordation of a future-broadcast show.

Additionally, IRD 310 is responsible for responding to a plurality of commands from a remote control 315. Remote control 315 may include any type of remote control, including one described in U.S. Pat. No. 5,453,758 assigned to Sony Corporation of Tokyo, Japan. Examples of commands from remote control 315 include a first command causing IRD 310 to produce an output signal displaying at least an electronic guide screen on TV 320. Likewise, a second command causes one of two conditions to occur. The condition depends on whether, upon initiating the second command, a cursor controlled by remote control 315 has already selected (e.g., highlight a portion of the electronic guide screen) either (i) a grid of a current-broadcast show, or (ii) a grid of a future-broadcast show. If the grid of a current-broadcast show has been selected, initiation of the second command would cause IRD 310 to tune to the broadcast channel of that show. If the grid of a future-broadcast show has been selected, initiation of the second command would cause IRD 310 to produce a screen menu for display with the electronic guide screen. The screen menu includes a number of option grids as shown in FIG. 6. Upon scrolling the screen menu to a selected option grid and initiating a third command from the remote control 315, programming data associated with the show would be either (i) loaded into timer memory and scheduled for recordation, or simply loaded into timer memory as discussed below.

Figure 4:
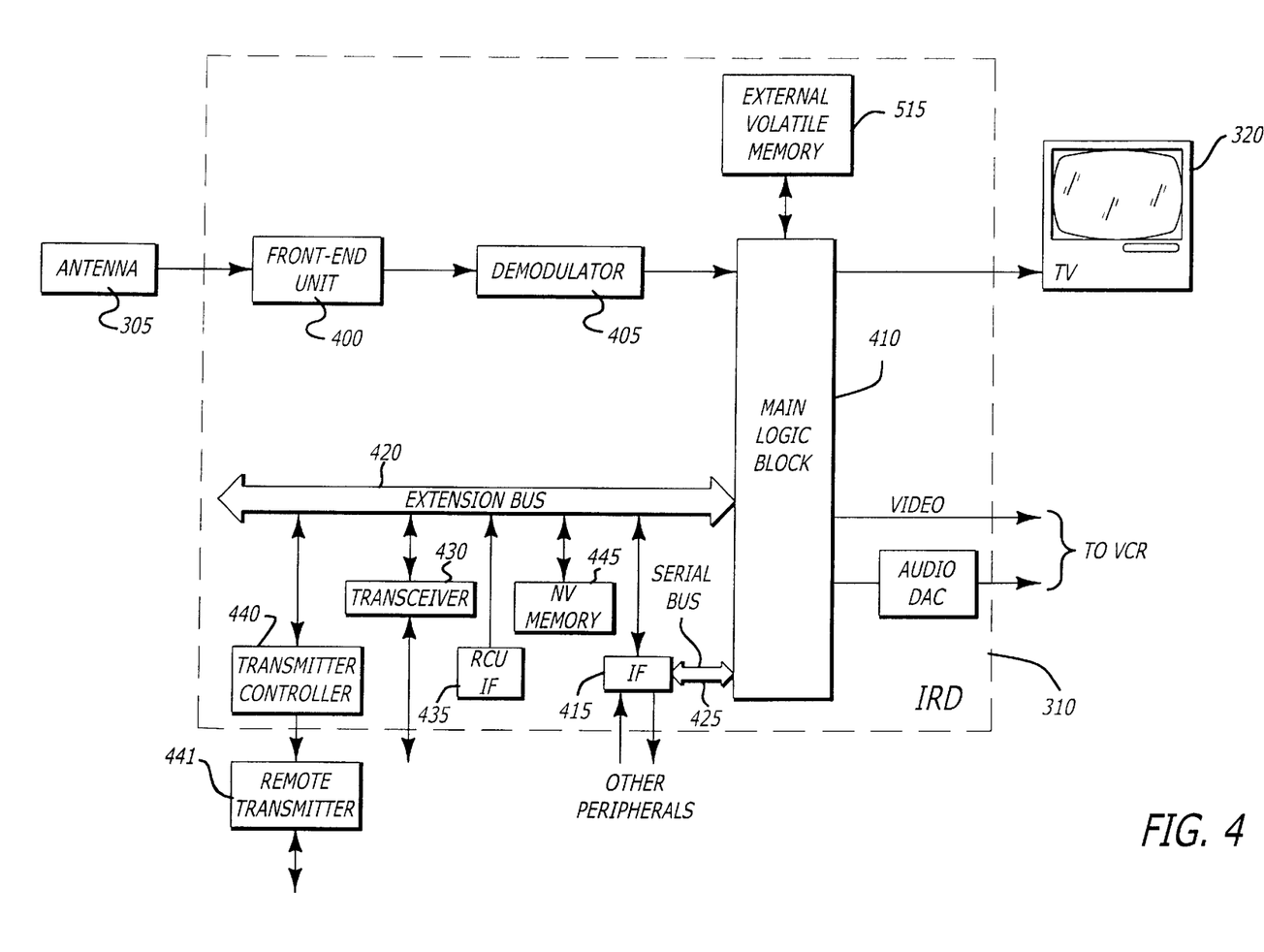
FIG. 4 is a detailed block diagram of one embodiment of an integrated receiver decoder implemented within the entertainment system of FIG. 3.

Referring now to FIG. 4, one embodiment of an integrated receiver decoder (IRD) 310 is shown. The antenna 305 transfers the bit stream to a front-end unit 400 of the IRD 310. Although not shown, the front-end unit 400 includes (i) amplification circuitry used to amplify any relatively weak signals received at antenna 305, and (ii) a tuner which allows a user to receive a desired broadcast channel.

For the case where the user wishes to view a show provided by the digital satellite system service provider, the bit stream associated with the desired broadcast channel is routed from front-end unit 400 to a demodulator 405. In demodulator 405, the bit stream is initially processed before transferring to a main logic block 410 for further processing. Such initial processing may include exposing the bit stream to QPSK-demodulation, viterbi-decoding, de-interleaving and Reed-Solomon decoding.

In certain situations, IRD 310 is connected to other peripheral devices though an interface (IF) 415. In this embodiment, IF 415 may include a link layer integrated circuit (IC) and a physical layer IC (not shown) and complies with the IEEE standards document 1394 entitled "Standard for High Performance Serial Bus" (hereinafter referred to as "IEEE 1394"). This enables IRD 310 to connect to digital-input peripheral devices such as digital VCRs, digital video disk players, digital laser disk players and the like. These digital-input peripheral devices communicate with a central processing unit (CPU) within main logic block 410 (see FIG. 5) through IF 415 and either extension bus 420 or alternatively an IEEE 1394 serial bus 425.

Referring still to FIG. 4, extension bus 420 supports input/output (I/O) communications by providing a communication path between electronic circuitry of the main logic block 410 and a number I/O related devices. These I/O related devices include a transceiver device 430 (e.g., a modem), a remote command unit interface (RCU-IF) 435, a transmitter controller 440 and an external non-volatile memory element 445 (e.g., read only memory "ROM", flash memory, etc.) acting as timer memory. RCU-IF 435 receives commands from the remote control (not shown), and decodes the commands to produce interrupt request signals (IRQs) corresponding to these commands. Each IRQ is transferred to the CPU within the main logic block 410.

Transmitter controller 440 provides a communication mechanism so that IRD 310 is able to communicate with an analog VCR via a remote transmitter 441 when one of the shows is scheduled to experience a timer event such as a timed recording. Otherwise, communications between the transmitter controller 440 and the remote transmitter 441 are disabled. Examples of the remote transmitter 441 may include, but are not limited or restricted to infrared transmitters such as those manufactured and commercially available from Matsushita of Osaka, Japan (referred to as a "VCR mouse"). External non-volatile (NV) memory element 445 is connected to extension bus 420 and contains programming data of shows scheduled to be recorded or to be viewed upon purchase, and software that controls the behavior of the user interface displays based on commands from the remote control as described above and in reference to FIGS. 5 and 6.

Figure 5:
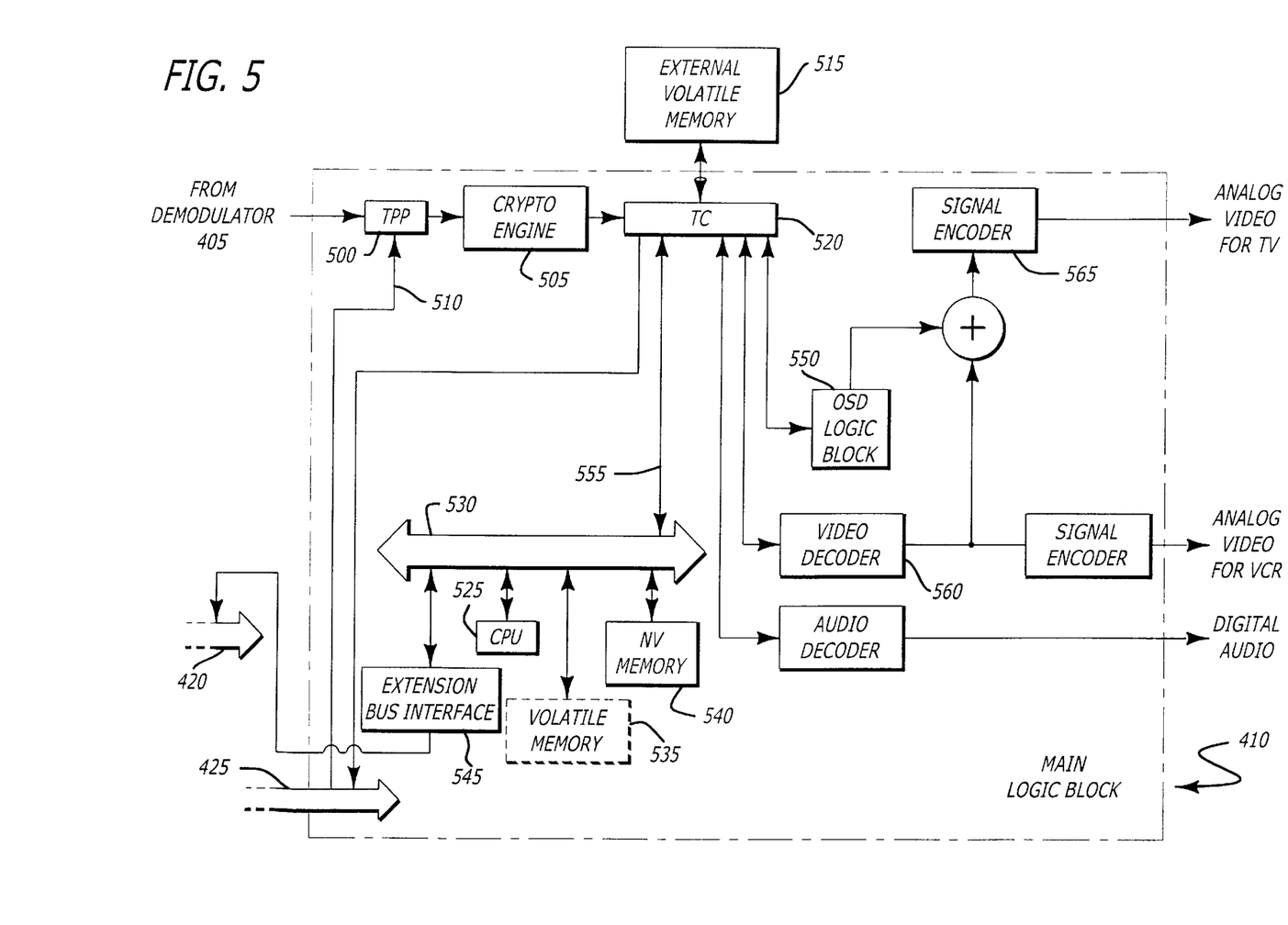
FIG. 5 is a detailed block diagram illustrating one embodiment of a main logic block of the integrated receiver decoder of FIG. 4.

Referring now to FIG. 5, electronic circuitry of the main logic block 410 is shown. The Transport Packet Parser (TPP) 500 receives the decoded bit stream and parses the bit stream. This parsed bit stream is decrypted by a cryptographic engine 505 which may operate in accordance with a cryptographic function, for example Data Encryption Standard (DES). However, if the bit stream is received from IF 415 via communication line 510, cryptographic engine 505 will be precluded from decrypting the bit stream since it is already in a decrypted form. Thereafter, the decrypted bit stream, including the programming data, is stored in an external volatile memory 515 (e.g., random access memory "RAM") under the control of traffic controller (TC) 520.

CPU 525 controls the operations of the IRD by communicating with a plurality of elements through an internal high-speed bus 530. These elements include an optional volatile memory 535, at least one non-volatile (NV) memory element 540 (e.g., read only memory "ROM", erasable programmable read only memory "EPROM", flash memory, etc.) to contain software programs, extension bus interface 545, and traffic controller 520. NV memory element 540, in lieu of external NV memory 445 of FIG. 4, may be used to store software needed by CPU 525 (e.g., interrupt software) or perhaps timer data. Extension bus interface 545 allows CPU 525 to communicate with the devices coupled to extension bus 420.

Referring to FIGS. 4–5, the operations performed by IRD 310 to support selective recording of programming data associated with a desired show are described. Upon receiving the first command from the remote control (e.g., user depressing "guide" button of remote control), RCU-IF 435 transfers a first interrupt request signal (IRQ1), corresponding to the first command, directly to CPU 525 or indirectly through a queuing mechanism (not shown). In response to detecting IRQ1, CPU 525 executes interrupt software contained in external NV memory element 445 (or NV memory element 540) and services IRQ1.

More specifically, in order to service IRQ1, CPU 525 executes interrupt software, normally coded to control an on-screen display (OSD) logic block 550, to produce the electronic guide screen. The first operation involves CPU 525 signaling traffic controller 520, via communication line 555, to retrieve at least programming data contained in external volatile memory 515 and route the programming data to OSD logic block 550. Next, CPU 525 controls OSD logic block 550 to decompress the programming data in accordance with a recognized video format and to produce (for display) the electronic guide screen in a manner well-known in the art. In general, the programming data is processed as a bitmap to overlay appropriate grids forming the layout of the electronic guide screen.

The electronic guide screen may be superimposed over video by mixing the electronic guide screen with video output from video decoder 560. The video output is video received by main logic block 410 and decompressed in accordance with Moving Picture Experts Group (MPEG), Joint Picture Experts Group UPEG) or any other video decompression function. Alternatively, the electronic guide screen may be superimposed over a still background. In any event, the resulting mixed video output is transferred to signal encoder 565. Signal encoder 565 converts the mixed video output into an analog signal having a recognized video format such as NTSC, PAL, SECAM and the like.

As the user selects a grid of the electronic guide screen associated with a current-broadcast show, CPU 525 causes the front-end unit 400 to tune to receive and display video of that show as background. Upon RCU-IF 435 receiving the second command from the remote control (e.g., user depressing "select" button of the remote control) while the grid of the current-broadcast show is selected, RCU-IF 435 transfers a second interrupt request signals (IRQ2). In response to detecting IRQ2, CPU 525 executes interrupt software and services IRQ2 by signaling the front-end unit 400 to tune to the broadcast channel of the current-broadcast show and to discontinue producing the electronic guide screen.

In the event that a future-broadcast show is selected, a still background is provided. Upon receiving the second command from the remote while the grid of the future-broadcast show is selected, RCU-IF 435 transfers a third interrupt request signals (IRQ3). In response to detecting IRQ3, CPU 525 executes interrupt software and services IRQ3 by signaling OSD logic block 550 to further superimpose a screen menu 600 over the electronic guide screen as shown in FIG. 6.

Referring now to FIG. 6, the screen menu 600 includes a header 605 and a plurality of option grids $610_{1-4}$. For example, as shown, the header grid 605 indicates that the user has selected a future-broadcast show. A first option grid $610_1$, if selected, loads programming data of the desired show into external NV memory 445 (of FIG. 4), along with a first state value (e.g., logic "0"). When CPU 525 is executing timer software, the first state value is loaded into the record parameter to indicate that the show is not scheduled to be recorded. Likewise, a second option grid $610_2$, if selected, alternatively loads programming data associated with the desired show into external NV memory 445 (of FIG. 4), along with a second state value (e.g., logic "1"). When CPU 525 is executing timer software, the second state value is loaded into the record parameter to indicate that the show is scheduled to be recorded. The recording interval of option grids $610_2$ is one-time programming, although weekly or daily intervals may be possible.

As further shown in FIG. 6, the third option grid $610_3$, if selected, causes the IRD to tune to the channel which will be broadcasting this show. The fourth option grid $610_4$, if selected, allows the user to exit the screen menu 600 and to return to the electronic guide screen. The interrupt software used to produced the screen menu 600 also restricts cursor movement in scrolling of the option grids $610_1$–$610_4$.

Figure 8:
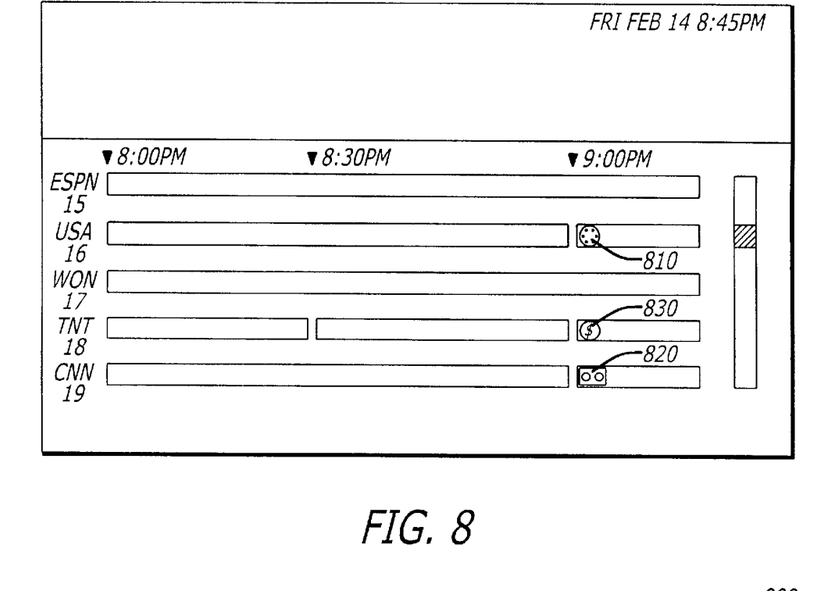
FIG. 8 is an embodiment of an electronic guide screen displayed on a television receiver illustrating placement of items along grids associated with shows loaded in timer memory for recording and non-recording, as well as future-broadcast pay-per-view show.

Referring to FIGS. 4–6, upon RCU-IF 435 receiving a third command from the remote control while the first option grid $610_1$ is selected, RCU-IF 435 transfers a fourth interrupt request signal (IRQ4). In response to detecting IRQ4, CPU 525 executes interrupt software contained in external NV memory element 445 and services IRQ4. Servicing IRQ4 involves retrieving programming data associated with the future-broadcast show from external volatile memory 515, automatically loading this programming data as well as the first state value into timer memory (e.g., external NV memory element 445). The first state value will be subsequently loaded into the record parameter of timer software, when executed, to preclude the transmitter controller 440 of IRD 310 from requesting the remote transmitter 441 to signal the analog recording device to record the future-broadcast show. In addition, servicing IRQ4 causes the grid associated with the future-broadcast show to include a first icon 810 as shown in FIG. 8. The first icon 810 represents that the show is loaded in timer memory of the IRD. The first icon 810 is generated by pre-loaded software and executed by CPU 525 which is a technique well-known in the art.

Still referring to FIGS. 4–6, if RCU-IF 435 receives a third command from the remote control while the second option grid $610_2$ is selected, RCU-IF 435 transfers a fifth interrupt request signal (IRQ5). In response to detecting IRQ5, CPU 525 executes interrupt software to control the interrupt service of IRQ5. IRQ5 is serviced by retrieving programming data associated with a future-broadcast show from external volatile memory 515 and automatically loading this programming data as well as the second state value into timer memory. However, in this event, a communication line between the transmitter controller 440 and the remote transmitter 441 remains enabled. In addition, the interrupt software causes the grid associated with this future-broadcast show to include a second icon 820 in lieu of the first icon (see FIG. 8). The second icon 820 indicates that the show is to be recorded.

Figure 7:
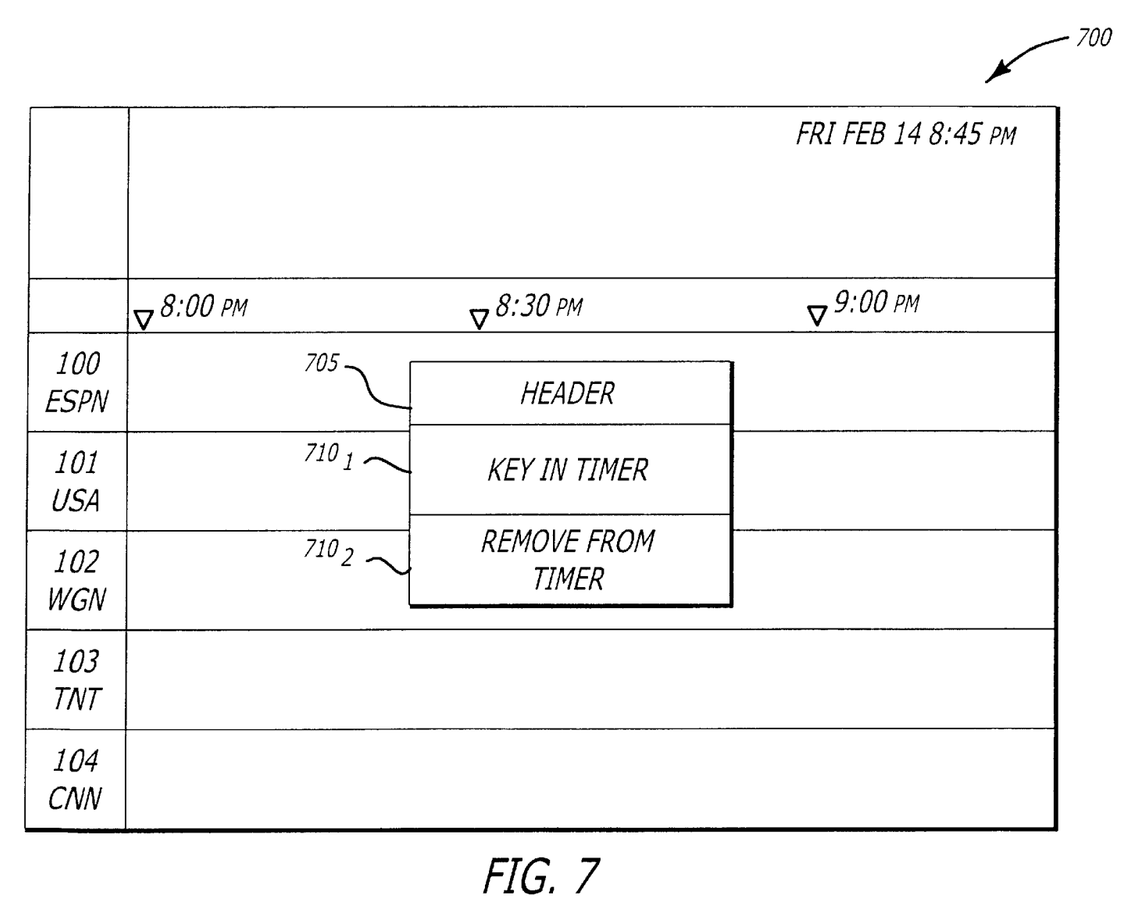
FIG. 7 is an embodiment of a screen menu, including a header and a plurality of option grids, superimposed over the electronic guide screen when a selecting or deselecting recordation of a future-broadcast show that has already been selected for recording.

Referring to FIG. 7, in the event that programming of the future-broadcast show is attempted, but the show has already been scheduled for recording, the IRD generates a menu 700 over the electronic guide screen. The menu 700 includes a header 705 which indicates that the selected future-broadcast show has already been loaded in timer memory. The menu 700 further includes a first option grid $710_1$ and a second option grid $710_2$. The first option grid $710_1$, if selected, simply leaves the programming data of the selected future-broadcast show in the timer memory. The second option grid $710_2$, if selected, causes removal of this programming data from timer memory. This allows the user to know which selected shows are being recorded when viewing the electronic guide screen.

It is contemplated that other operations, besides recording, may be configured to be selected or deselected during viewing of the electronic guide screen or another screen. For example, as shown in FIGS. 4–5 and 8, the purchase of a show (e.g., a pay-per-view show) may be selected or deselected. For example, upon RCU-IF 435 receiving the third command from the remote while a grid associated with a pay-per-view show is highlighted, RCU-IF 435 transfers a sixth interrupt request signal (IRQ6). In response to detecting IRQ6, CPU 525 executes interrupt software, also contained in external NV memory element 445, to service IRQ6 by generating one or more subsequent display screens (not shown) overlaid over the electronic guide screen or substituted for the electronic guide screen. These screens require user interaction to confirm the purchase of a future-broadcast show and to request whether the programming data associated with purchased show is to be loaded into timer memory. Thereafter, the interrupt software causes the grid associated with the purchased show, to include a third icon 830 to represent that the show has been purchased as shown.

Figure 9:
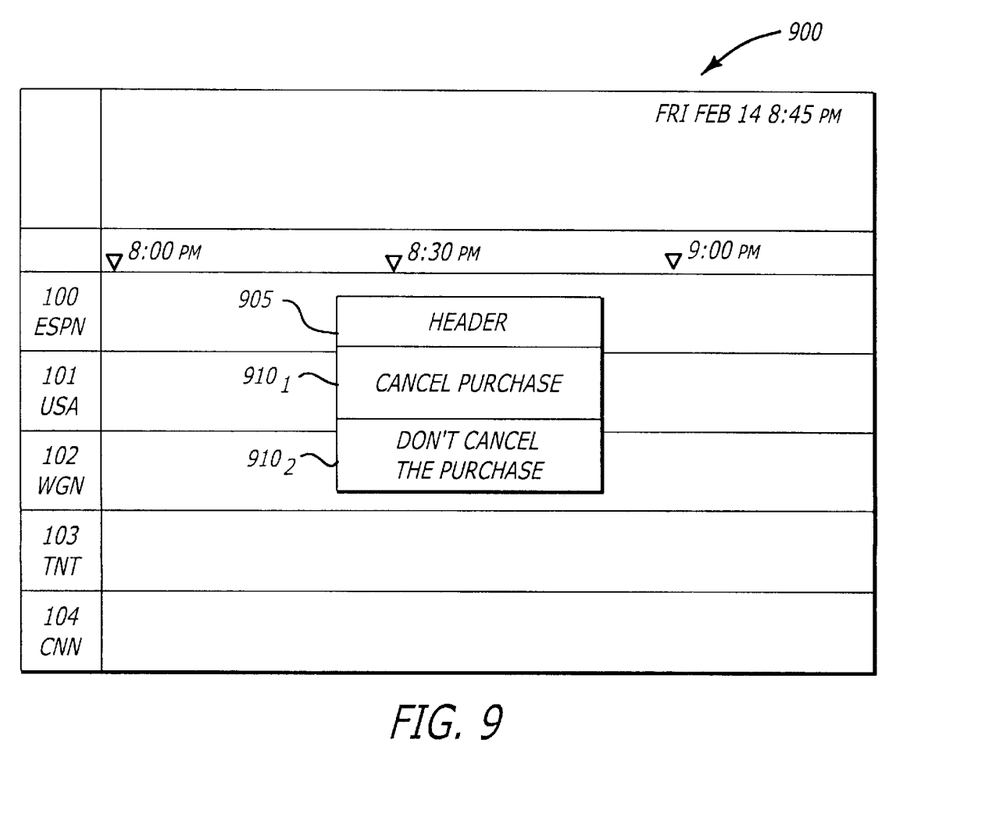
FIG. 9 is an embodiment of a screen menu, including a header and a plurality of option grids, superimposed over the electronic guide screen to allow cancellation of a purchased future-broadcast show.

Referring to FIG. 9, if a grid is selected and the grid is associated with a future-broadcast show that has already been purchased, the IRD generates a menu 900 over the electronic guide screen. The menu 900 includes a header 905 which indicates that the selected future-broadcast show has already been purchased. The menu 900 further includes a first option grid $910_1$ and a second option grid $910_2$. The first option grid $910_1$ is selected to cancel the purchase so that the IRD is incapable of tuning to receive the purchased show. In addition, the third icon 830 is removed from display on the electronic guide screen. The second option grid $910_2$ is selected to avoid canceling the purchase, but instead, returns to the electronic guide screen or another display screen. This mechanism allows the user to cancel shows that have been purchased before time of viewing.

The present invention described herein may be designed in many different embodiments and using many different configurations. As discussed herein, the architecture of the IRD is flexible. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for selecting and deselecting a future-broadcast show capable of being received and displayed on an electronic guide screen, the method comprising:

generating a command to select a schedule option grid from at least a first schedule option grid and a second schedule option grid of a first screen menu superimposed over the electronic guide screen, the command causing a loading of programming data of the future-broadcast show into a timer memory of an entertaining system, the future-broadcast show being a show (i) scheduled to be recorded when the second schedule option grid is selected and (ii) not scheduled to be recorded when the first schedule option grid is selected;

generating an icon on the electronic guide screen, the icon being a record icon if the future-broadcast show being the show scheduled to be recorded and a non-record icon if the future-broadcast show being the show not schedule to be recorded, thereafter, the non-record icon being removed if the command selecting the second schedule option grid; and generating a second screen menu including at least first and second select option grids, the first select option grid, if selected, allowing the loaded programming data to be left in the timer memory, the second select option grid, if selected, allowing the loaded programming data to be removed from the timer memory.

2. The method of claim 1, wherein prior to generating the command to select the schedule option grid, the method further comprising:

receiving a digital bit stream including the programming data associated with the future-broadcast show and sensory data corresponding to the programming data.

3. The method of claim 1, wherein the loading of the programming data into the timer memory includes loading of a first state value to indicate that the future-broadcast show is not scheduled to be recorded.

4. The method of claim 1, wherein the loading the programming data into the timer memory includes loading of a second state value to indicate that the future-broadcast show is scheduled to be recorded.

5. The method of claim 1 further comprising exiting the first screen menu when a return option grid is selected.

6. The method of claim 1 further comprising generating a first icon onto a portion of the electronic guide screen associated with the future-broadcast show to represent that the future-broadcast show is not scheduled to be recorded.

7. The method of claim 1 further comprising generating a second icon onto the portion of the electronic guide screen associated with the future-broadcast show to represent that the future-broadcast show is scheduled to be recorded.

8. The method of claim 1 further comprising tuning to the future-broadcast show when a tune option grid is selected.

9. The method of claim 1 further comprising:

generating a second command to select a grid associated with a futures broadcast show to be purchased, the future-broadcast show having programming data.

10. The method of claim 9 further comprising:

generating a third command to display a display screen, the display screen being one of a screen overlaying the electronic guide screen and a screen substituting the electronic guide;

confirming a purchase of the future-broadcast show by loading the programming data into a timer memory, the loading of the programming data causes an icon to appear on the display screen; and generating a screen menu superimposing over the electronic guide screen, the screen menu including a header grid indicating the selected future-broadcast show being purchased, a first purchase option grid, and second purchase option grid, the first purchase option grid, if selected, canceling the confirmed purchase, the second purchase option grid, if selected, not allowing canceling the confirmed purchase and returning to one of the electronic guide screen and the display screen.

11. An entertainment system comprising:

a display monitor; and a broadcast receiver coupled to the display monitor, the broadcast receiver including a front-end unit to receive programming data associated with a show broadcast for viewing on the display monitor, a plurality of memory elements, and a main logic block coupled to the plurality of memory elements and the front-end unit, the main logic block including a central processing unit to execute software to (i) generate a command to select a schedule option grid from at least a first schedule option grid and a second schedule option grid of a first screen menu, the command causing loading programming data of the future-broadcast show into a timer memory of the entertaining system, the future-broadcast show being a show (a) scheduled to be recorded when the second schedule option grid is selected and (b) not scheduled to be recorded when the first schedule option grid is selected, (ii) generate an icon on the electronic guide screen, the icon being a record icon if the future-broadcast show being the show scheduled to be recorded and a non-record icon if the future-broadcast show being the show not schedule to be recorded, thereafter, the non-record icon being removed if the command selecting the second schedule option grid, and (iii) generate a second screen menu including at least first and second select option grids, the first select option grid, if selected, allowing the loaded programming data to be left in the timer memory, the second select option grid, if selected, allowing the loaded programming data to be removed from the timer memory.

12. The entertainment system of claim 10, wherein the display monitor includes a television receiver.

13. The entertainment system of claim 11, wherein the main logic block further includes a controller to control the routing of information between at least the front-end unit, the plurality of memory elements and the central processing unit.

14. The entertainment system of claim 13, wherein loading programming data of the future-broadcast show into the time memory is loading the programming data into the one of the plurality of memory elements along with a second state value indicating that the future-broadcast show is not scheduled to be recorded.

15. The entertainment system of claim 14, wherein the central processing unit controlling the loading of the programming data into the one of the plurality of memory elements along with a third state value indicating that the show is scheduled to be recorded.

16. The entertainment system of claim 14, wherein the software further includes a data structure to produce a first icon to represent that the show is not scheduled to be recorded.

17. A broadcast receiver comprising:

a front-end unit to receive programming data associated with a show broadcast for viewing;

a plurality of memory elements; and a main logic block coupled to the plurality of memory elements, the main logic block including a processor to execute software to (i) receive a command to select a schedule option grid from at least a first schedule option grid and a second schedule option grid of a first screen menu superimposed over an electronic guide screen, the command causing loading programming data of future-broadcast show into a timer memory of an entertaining system, the future-broadcast show being a show (a) scheduled to be recorded when the second schedule option grid is selected and (b) not scheduled to be recorded when the first schedule option grid is selected, (ii) generate an icon on the electronic guide screen, the icon being a record icon if the future-broadcast show being the show scheduled to be recorded and a non-record icon if the future-broadcast show being the show not schedule to be recorded, thereafter, the non-record icon being removed if the command selecting the second schedule option grid, and (iii) generate a second screen menu including at least first and second select option grids, the first select option grid, if selected, allowing the loaded programming data to be left in the timer memory, the second select option grid, if selected, allowing the loaded programming data to be removed from the timer memory.

18. The broadcast receiver of claim 17 wherein the processor to execute software to (iv) receive a second command to select a grid associated with a future-broadcast show to be purchased, the future-broadcast show having programming data.

19. The broadcast receiver of claim 18 further comprising generating a purchase icon onto the portion of the electronic guide screen associated with the future-broadcast show to represent that the future broadcast show had been purchased.

20. The broadcast receiver of claim 18 further comprising:

(v) generate a second command to display a display screen, the display screen being one of a screen overlaying the electronic guide screen or a screen substituting the electronic guide screen, (vi) confirm a purchase of the future-broadcast show by loading the programming data Into a timer memory, the loading of the programming data causes an icon to appear on the display screen, and (vi) generate a screen menu superimposing over the electronic guide screen, the screen menu including a header grid option indicating the selected future-broadcast show being purchased, a first purchase option grid, and a second purchase option grid, the first purchase option grid, if selected, canceling the confirmed purchase, the second purchase option grid, if selected, not allowing canceling the confirmed purchase and returning to one of the electronic guide screen and the display screen.

* * * * *